(12) United States Patent
Heninger et al.

(10) Patent No.: US 7,975,294 B2
(45) Date of Patent: Jul. 5, 2011

(54) VPN MANAGEMENT

(75) Inventors: Ivan M. Heninger, Selma, NC (US);
John D. Kari, Coeur D'Alene, ID (US);
William J. Rippon, Putnam Valley, NY (US); Galina Rubinshtein, Holon (IL)

(73) Assignee: International Business Machines Corporation, Armonk, NY (US)

( * ) Notice: Subject to any disclaimer, the term of this patent is extended or adjusted under 35 U.S.C. 154(b) by 897 days.

(21) Appl. No.: 11/942,273

(22) Filed: Nov. 19, 2007

(65) Prior Publication Data
US 2009/0133115 A1    May 21, 2009

(51) Int. Cl.
*G06F 9/00* (2006.01)
*G06F 15/16* (2006.01)
*G06F 17/00* (2006.01)
*G06F 15/173* (2006.01)
*H04W 4/00* (2009.01)
*H04M 3/42* (2006.01)

(52) U.S. Cl. ......... 726/15; 709/202; 709/203; 709/223; 709/229; 455/426.1; 455/414.1

(58) Field of Classification Search .................. None
See application file for complete search history.

(56) References Cited

U.S. PATENT DOCUMENTS

| | | | |
|---|---|---|---|
| 7,366,794 B2 * | 4/2008 | Poeluev | 709/246 |
| 7,596,806 B2 * | 9/2009 | Chen | 726/11 |
| 2004/0205175 A1 * | 10/2004 | Kammerer | 709/223 |
| 2005/0022012 A1 * | 1/2005 | Bluestone et al. | 713/201 |
| 2007/0086462 A1 * | 4/2007 | Zhang et al. | 370/392 |
| 2007/0124393 A1 * | 5/2007 | Maes | 709/206 |
| 2008/0004011 A1 * | 1/2008 | Ober | 455/435.1 |

* cited by examiner

*Primary Examiner* — Shin-Hon Chen
(74) *Attorney, Agent, or Firm* — DeLizio Gilliam, PLLC

(57) ABSTRACT

A client attempts to transmit a presence state to a presence server that is behind a firewall of a secure network. If the client is inside the firewall, the presence server instructs resources within the secure network to directly communicate with the client. However, if the client is outside the firewall, then the client must tunnel into the secure network via a Virtual Private Network (VPN) before accessing the resources in the secure network.

17 Claims, 4 Drawing Sheets

VPN MANAGEMENT

BACKGROUND OF THE INVENTION

The present invention relates in general to data processing systems and in particular to computer software. Still more particularly, the present invention relates to an improved method and system for managing usage of a Virtual Private Network (VPN).

A Virtual Private Network (VPN) is a communications network that tunnels through another specifically dedicated network. That is, a VPN allows an authorized user to tunnel through a firewall or other blockade in order to access resources in another network. The VPN may act as a "traffic cop" that directs outside traffic to a particular resource, internal network, etc. within a secure network, or the VPN may act as a security device that checks passwords, authorization, etc. for entry into the secure network. A VPN is usually expensive, and thus its use needs to be judicious.

SUMMARY OF THE INVENTION

A client attempts to publish presence state to a presence server that is behind a firewall of a secure network. If the client is inside the firewall, the presence server instructs resources within the secure network to directly communicate with the client. However, if the client is outside the firewall, then the client must tunnel into the secure network via a Virtual Private Network (VPN) before accessing the resources in the secure network. The Session Initiation Protocol (SIP) presence state for particular clients, who may or may not be using VPN, is consumed by applications in decisions related to operational expense of a particular client session.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
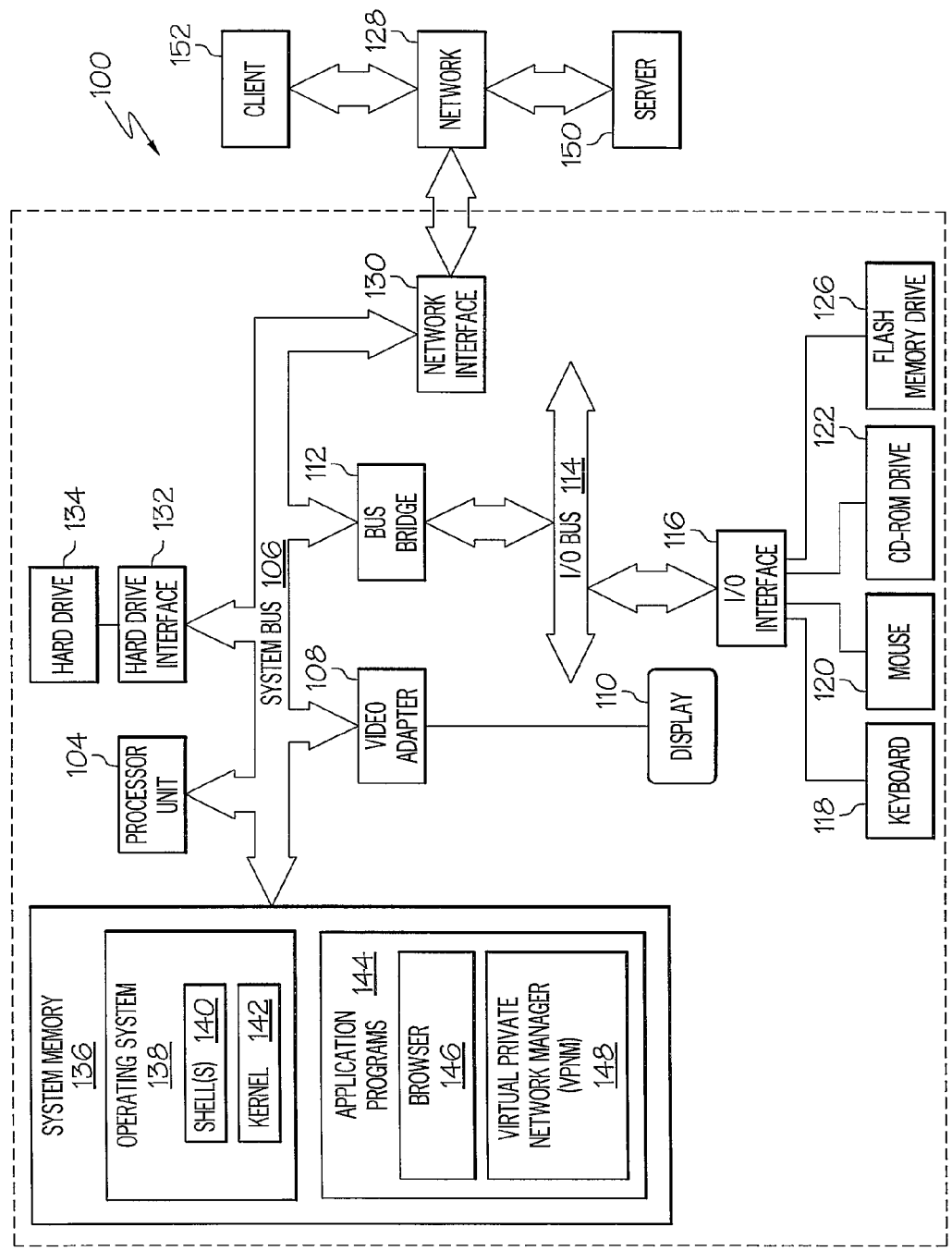
FIG. 1 depicts a high level block diagram of an exemplary computer, according to an embodiment of the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the client's computer, partly on the client's computer, as a stand-alone software package, partly on the client's computer and partly on a remote computer or entirely on the remote computer or server. In the latter scenario, the remote computer may be connected to the client's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Virtual Private Network Manager (VPNM) 148. VPNM 148 performs the functions illustrated below in FIGS. 2-5.

In one embodiment, computer 100 is able to download VPNM 148 from service provider server 150, preferably in an "on demand" basis. In another embodiment, service provider server 150 performs all of the functions associated with the present invention (including execution of VPNM 148), thus freeing computer 100 from using its own resources.

A client 152, which may also utilize an architecture such as that depicted for computer 100, is coupled to the computer 100 via the network 128. Thus, the client 152 represents hardware used by client 208 shown in the figures below, while computer 100 represents hardware that may be used by the SIP Presence Server 206, the VPN Server 210, the Firewall 204, and/or the Secure Network's resources 212 described below in FIGS. 2-3.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
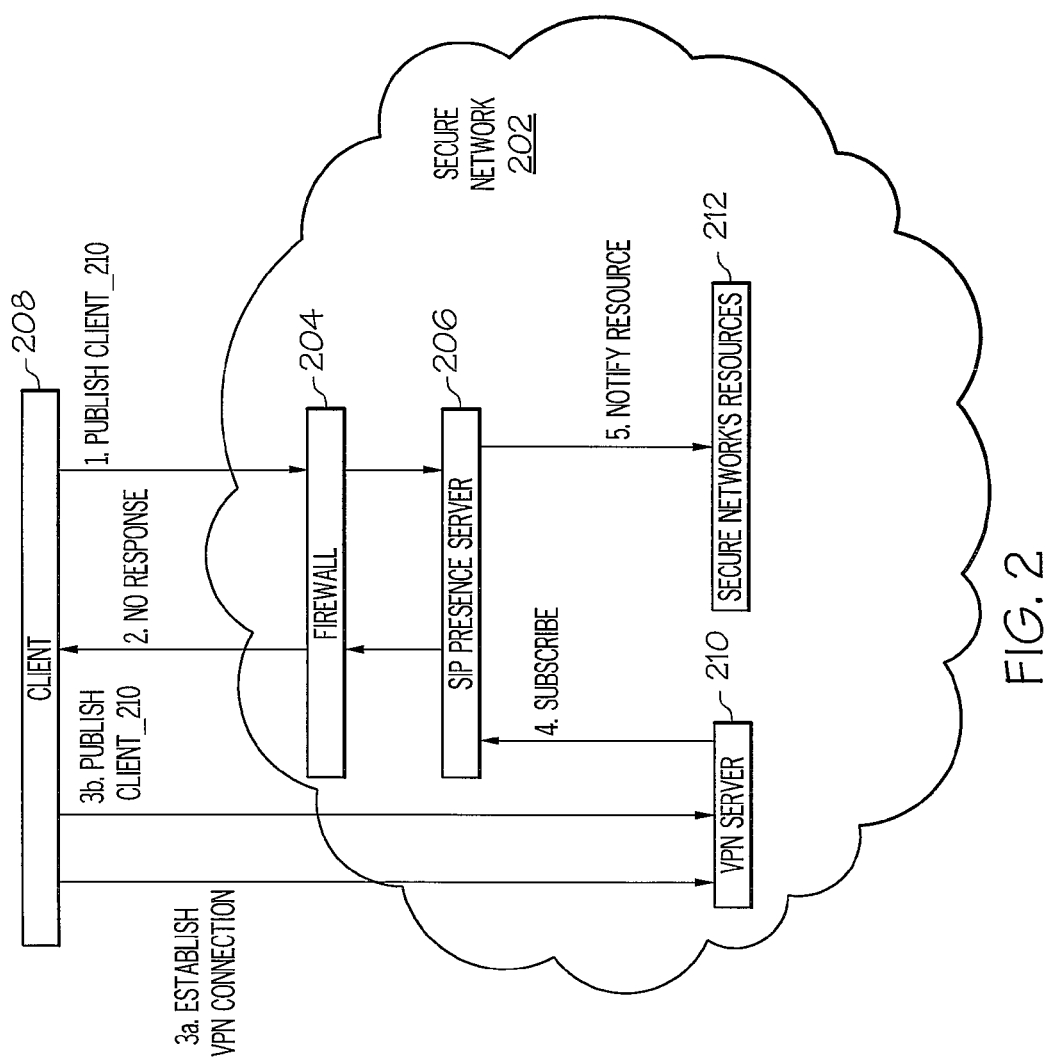
FIG. 2 illustrates a client unsuccessfully attempting to cross a firewall of a secure network to access a Presence Server, and thus must tunnel into the secure network via a Virtual Private Network (VPN)

With reference now to FIG. 2, a secure network 202 is depicted. Note that secure network 202 has a firewall 204, which prevents unauthorized access to the secure network, including the Session Initiation Protocol (SIP) Presence Server 206. Thus, when a client 208 attempts to 1) PUBLISH the presence of client 210 (PUBLISH client 210), the client 208 2) receives no response from the SIP presence server 206, since the PUBLISH command was blocked by the firewall 204. The client 208 then knows that it must 3) tunnel into the secure network 202 via a Virtual Private Network (VPN) server 210 by 3a) establishing a VPN connection with the VPN server 210 and 3b) PUBLISH the presence of the client 210 to the VPN server 210. Note that in one embodiment, the firewall 204 may send an instruction back (contemporaneous with the "No response") that directs the client 208 to the VPN server 210, thus making the access totally automatic (such that the user of the client machine need take no steps to access the secure network 202). That is, the "No response" may truly be a lack of response, which prompts the client 208 to access the VPN server 210, or the "No response" may actually be an instruction from the firewall 204 instructing the client 208 to access the VPN server 210.

Once the client 208 has accessed the VPN server 210, he is allowed to tunnel into the secure network's resources 212. Examples of the secure network's resources 212 include, but are not limited to, software packages, operating systems, e-mail, memory storage devices, networks (e.g., intranets, the Internet, etc.), processors, servers, etc. That is, the secure network's resources 212 may include any hardware or software that is intended to be used only by clients that are inside (or have used the VPN server 210 to legitimately bypass) the firewall 204.

After the client tunnels into the secure network 202 through the VPN server 210, the client 208 will now be able to successfully PUBLISH its presence state to the SIP Presence Server 206 and the VPN server 210, to which the client is connected. The VPN server 210 will then 4) SUBSCRIBE to the presence state of the client via the SIP Presence Server 206. That is, if there is any change to the presence state of the client 208 in the future (e.g., if the client 208 is a laptop computer that has physically (and/or logically) moved to or within the confines of the secure network 202), the VPN server 210 will be notified via a SIP Notify from the SIP Presence Server 206 (for reasons explained below). Once the client 208 has tunneled into the secure network 202 via the VPN server 210, the SIP Presence Server 206 will 5) Notify the secure network's resources 212 that any communication with the client 208 must be via the VPN server 210. The VPN Server 210 may send a similar message to the secure network's resources 212.

Figure 3:
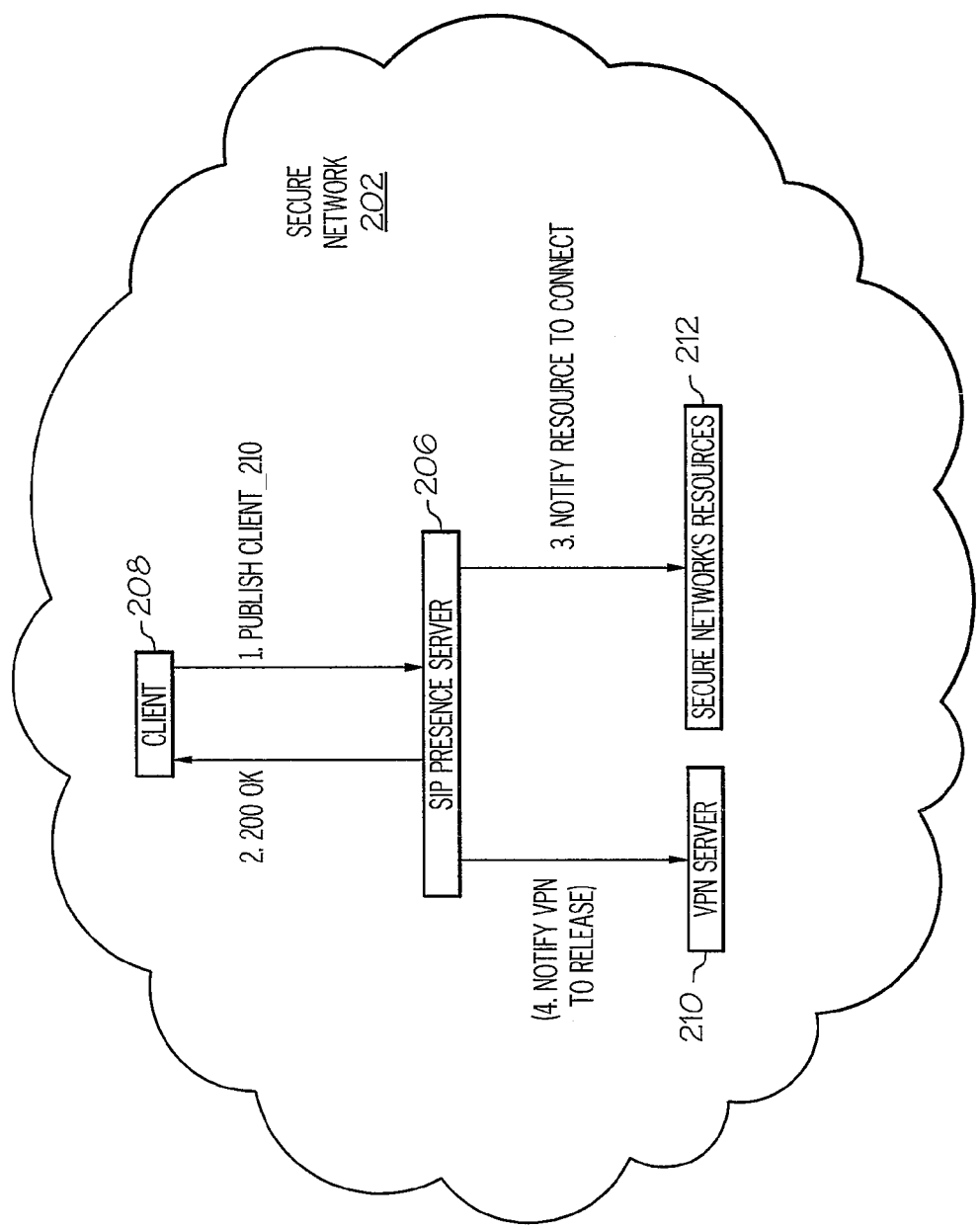
FIG. 3 depicts a client that is inside the secure network, and thus is able to directly access the secure network's resources without the VPN.

With reference now to FIG. 3, assume that the client 208 is now within the physical and/or logical confines of the secure network 202. Now when the client 208 attempts to 1) PUBLISH presence state to the SIP Presence Server 206, 2) a valid response ("200 OK" using the SIP protocol) is sent from the SIP Presence Server 206 to the client 208. The SIP Presence Server 206 3) notifies the secure network's resources 212 that any communication with the client 208 may be direct (and not through the VPN Server 210). Note that if the client 208 had previously been using the VPN server 210 (as described in FIG. 2), then 4) the SIP Presence Server 208 sends a SIP NOTIFY message to the VPN Server 210, instructing the VPN Server 210 to release the VPN connection utilized by client 208, thus saving expensive VPN Server 210 resources and improving the network performance of the client 208. Note also that, in one embodiment, the SIP NOTIFY messages (in steps 3 and 4) can be sent to all subscribers.

Note that while the client 208 is utilizing the VPN Server 210, the VPN Server 210 and/or the SIP Presence Server 206 may make only certain resources from the secure network's resources 212 available to the client 208. For example, mission critical, time critical, and/or delayed resources (i.e., high priority resources) may be sent to the client 208 via the VPN Server 210. Mission critical resources may include software that is critical for the client 208 to perform some task; time critical resources may include data that is time sensitive (is only useful for a limited amount of time); and delayed resources may include software that has been waiting more than some predetermined period of time to be downloaded to the client 208. However, when the client 208 (e.g., a laptop) physically enters a location inside the secure network 202 (e.g., when the client 208 starts using a secure IP address that is physically and/or logically contained within the boundaries of the secure network 202), then any resources that have not met these criteria (i.e., non-urgent low-priority resources) can then be bulk loaded to the client 208, since the expensive resources of the VPN Server 210 will not be utilized. That is, low-priority resources are withheld from the client 208 until the client 208 is physically within the secure network 202 (i.e., is not using the VPN server 210 to tunnel in).

Thus, as described in FIGS. 2-3, the success or failure of a SIP publish operation is used as an indicator of whether or not a client is within a trusted network.

Figure 4:
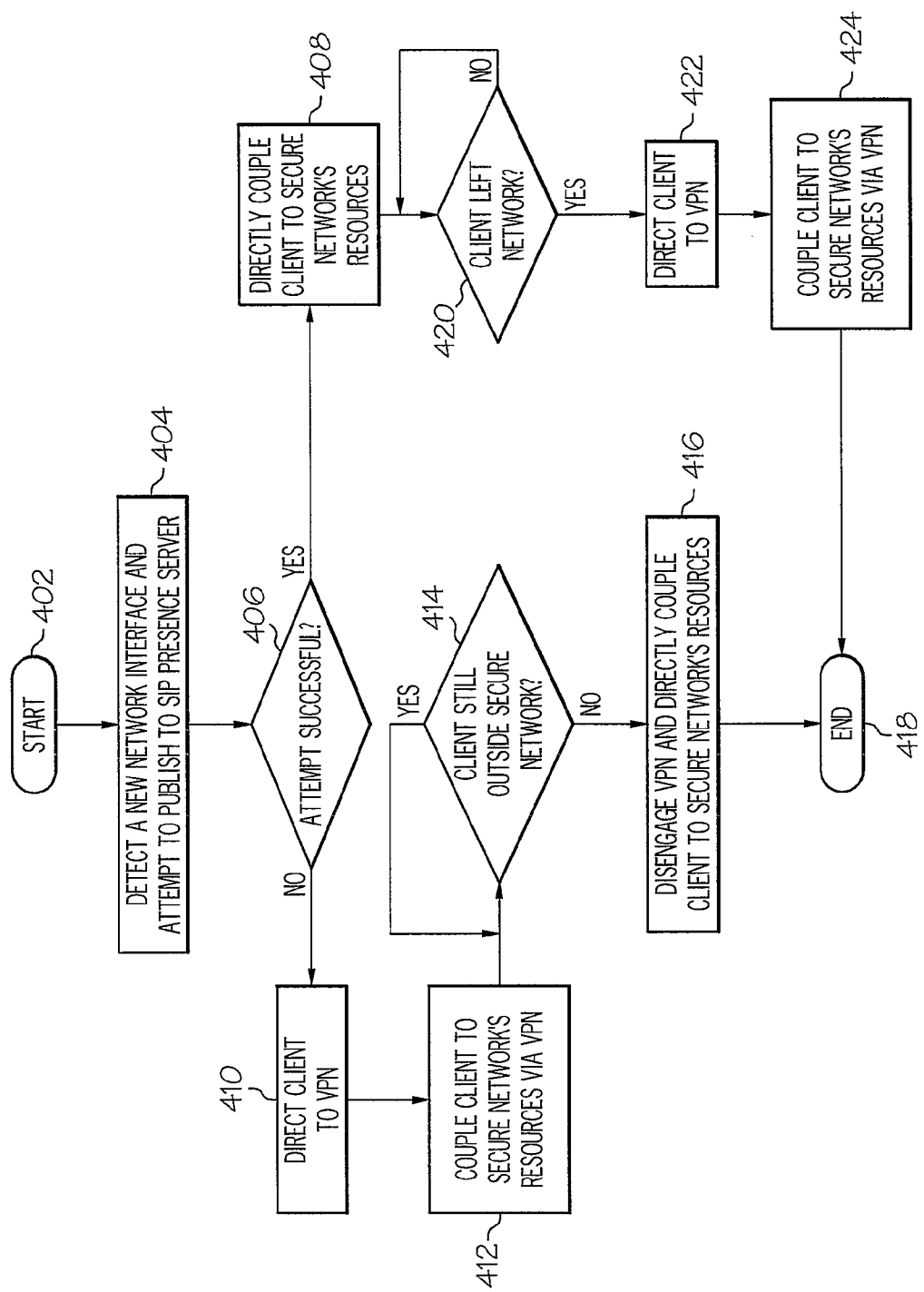
FIG. 4 is a high-level flow-chart of exemplary steps taken to control an application's usage of a VPN through the use of the Presence Server.

Referring now to FIG. 4, a flow-chart for utilizing a Presence Server to control usage of a VPN is presented. After initiator block 402 (which is prompted by the activation of a network interface on the client device, or is triggered by the appearance of a new active network interface on a client device), an attempt is made to complete a SIP Presence Publish transaction using the newly established interface (block 404). This attempt may be detected by a firewall (e.g., firewall 204 shown in FIG. 2) or any other monitoring logic associated with the secure network 202 shown in FIG. 2. If the attempt to publish to the SIP Presence Server is successful (query block 406), then the client must be within the secure network, and the SIP Presence status is updated to indicate "No VPN". Application logic driven by the SIP presence server is also updated to allow applications to initiate low priority, large data volume, activities. However, if the attempt to publish to the SIP Presence Server fails, then the client is outside the secure network and is directed to connect to the VPN (block 410), which allows the client to then access the secure network's resources (block 412) via tunneling. Note that in one embodiment, only high-priority activities are undertaken as long as the client is using the VPN. As long as the client remains outside the secure network (query block 414), all access to resources in the secure network must be through the VPN. However, if the client subsequently enters the secure network (e.g., successfully publishes SIP Presence external to the VPN tunnel), then the client disengages the VPN and directly accesses the secure network's resources (block 416). At this point, low-priority activities may be undertaken by applications, since there is no longer the expensive overhead associated with using the VPN. The process ends at terminator block 418.

Returning to block 408, as long at the client remains behind the firewall, the client is able to directly access the secure network's resources. However, as suggested by query block 420, if the client should leave the confines of the secure network (i.e., should acquire a non-secure IP address that is outside the firewall), then the client is directed to the VPN (block 422), in order to afford tunneling that allows the client to use the VPN to access the secure network's resources (block 424). At this point, only high-priority resources should be accessible to the client, due to the expensive overhead associated with using the VPN. As before, the process ends at terminator block 418.

The presently described invention thus provides a novel and useful means for controlling how a VPN is automatically invoked, depending on whether a client is inside or outside a firewall or other blockade to a secure network. The VPN automatically enables or disables itself, according to whether a client is able to access a Presence Server using non-VPN network interfaces. Thus, when a mobile client moves from an external untrusted physical network to a trusted enterprise owned physical network, the VPN automatically disables itself. Conversely, the transition from a trusted enterprise network to an untrusted network automatically engages the VPN. Automatic control over the VPN solves the problem associated with depending on each individual user having to determine what type of network they are connected to (trusted/untrusted), and then having to manually engage the VPN. As describe above, there is no need with the present invention for the client to have to manually stop/start the VPN.

Once the automatic invocation of the VPN occurs, controls can be put in place to restrict certain activities to non-VPN scenarios for security and cost considerations. For example, if the client is using the VPN, then only mission-critical or time-critical resources (e.g., software) may be downloaded to the client. When the client then enters the secure network (e.g., by using an IP address that is in a "hot spot" that is physically within an enterprise's facility), then resources that had been "on hold" for the client (while he was using the VPN) can now be downloaded in bulk with little expense.

Note that the present invention is unlike an enterprise Internet Protocol Version 4 (IPV4), which allows a VPN client to cache trusted IP addresses in order to disable the VPN upon entry into trusted address ranges. IPV4 allows trusted and non-trusted networks to intersect through the VPN client, since the VPN client is able to access both trusted and non-trusted IP network addresses. The present invention avoids this security problem associated with false positive trust association based on IP address trust by making the SIP Presence Server to be the "gatekeeper" of automatic VPN enable and disable. Furthermore, since the present invention allows the secure network to track whether the client is physically within or outside the secure network, the VPN is therefore "fenced" according to the physical location of the client.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for managing usage of a Virtual Private Network (VPN), the method comprising:
   detecting an attempt to publish a client presence state to a presence server, wherein the presence server is capable of detecting a change to a presence state of a client, wherein the presence server is available only to network addresses that are within a secure network, and wherein the secure network is accessible to the presence server;
   in response to the client failing the attempt to publish the client presence state to the presence server, accepting the client into the secure network only via a VPN that is dedicated to the secure network; and
   in response to the client moving into the secure network by acquiring a secure address for the secure network, notifying the VPN to release the client, wherein the client is able to directly communicate with resources in the secure network without using the VPN.

2. The method of claim 1, further comprising:
   in response to the client succeeding in directly publishing the client presence state to the presence server without using the VPN, instructing a resource in the secure network to directly communicate with the client.

3. The method of claim 1, further comprising:
   in response to the client failing to publish the client presence state to the presence server without using the VPN, instructing a resource in the secure network to communicate with the client only via the VPN.

4. The method of claim 3, wherein the resource in the secure network is a software supplier.

5. The method of claim 1, wherein the presence server is a Session Initiation Protocol (SIP) presence server.

6. The method of claim 1, further comprising:
   in response to the client leaving the secure network by acquiring a non-secure address that is unauthorized to access the secure network, directing the client to utilize the VPN upon any future attempts by the client to access the secure network.

7. A system comprising:
   a processor;
   a data bus coupled to the processor;
   a memory coupled to the data bus; and
   a computer-usable medium embodying computer program code, the computer program code comprising instructions executable by the processor and configured for managing a Virtual Private Network (VPN) by performing the steps of:
   detecting an attempt to publish a client presence state to a presence server, wherein the presence server is capable of detecting a change to a presence state of a client, wherein the presence server is available only to network addresses that are within a secure network, and wherein the secure network is accessible to the presence server;
   in response to the client failing the attempt to publish the client presence state to the presence server, accepting the client into the secure network only via a VPN that is dedicated to the secure network; and
   in response to the client succeeding in directly publishing the client presence state to the presence server without using the VPN, instructing a resource in the secure network to directly communicate with the client.

8. The system of claim 7, wherein the instructions are further configured for:
   in response to the client moving into the secure network by acquiring a secure address for the secure network, notifying the VPN to release the client, wherein the client is able to directly communicate with resources in the secure network without using the VPN.

9. The system of claim 7, wherein the instructions are further configured for:
   in response to the client failing to publish the client presence state to the presence server without using the VPN, instructing a resource in the secure network to communicate with the client via the VPN.

10. The system of claim 7, wherein the instructions are further configured for:
   in response to the client leaving the secure network by acquiring a non-secure address that is unauthorized to access the secure network, directing the client to utilize the VPN upon any future attempts by the client to access the secure network.

11. A non-transitory computer-readable storage medium encoded with a computer program, the computer program comprising computer executable instructions configured for:
   detecting an attempt to publish a client presence state to a presence server, wherein the presence server is capable of detecting a change to a presence state of a client, wherein the presence server is available only to network addresses that are within a secure network, and wherein the secure network is accessible to the presence server;
   in response to the client failing the attempt to publish the client presence state to the presence server, accepting the client into the secure network only via a VPN that is dedicated to the secure network; and
   in response to the client failing to publish the client presence state to the presence server without using the VPN, instructing a resource in the secure network to communicate with the client via the VPN.

12. The non-transitory computer-readable storage medium of claim 11, wherein the instructions are further configured for:
   in response to the client moving into the secure network by acquiring a secure address for the secure network, notifying the VPN to release the client, wherein the client is able to directly communicate with resources in the secure network without using the VPN.

13. The non-transitory computer-readable storage medium of claim 11, wherein the instructions are further configured for:
   in response to the client succeeding in directly publishing the client presence state to the presence server without using the VPN, instructing a resource in the secure network to directly communicate with the client.

14. The non-transitory computer-readable storage medium of claim 11, wherein the resource in the secure network is a software supplier.

15. The non-transitory computer-readable storage medium of claim 11, wherein the instructions are further configured for:
   in response to the client leaving the secure network by acquiring a non-secure address that is unauthorized to access the secure network, directing the client to utilize the VPN upon any future attempts by the client to access the secure network.

16. The non-transitory computer-readable storage medium of claim 11, wherein the computer-usable medium is a component of a remote server, and wherein the computer executable instructions are deployable to a local client computer from the remote server.

17. The non-transitory computer-readable storage medium of claim 11, wherein the computer executable instructions are capable of being provided by a service provider to a customer on an on-demand basis.

\* \* \* \* \*